Oct. 28, 1952

G. F. QUAYLE 2,615,677

PALLET TRUCK

Filed April 24, 1948

INVENTOR
George F. Quayle
BY
A. H. Golden
ATTORNEY

Patented Oct. 28, 1952

2,615,677

UNITED STATES PATENT OFFICE 2,615,677

PALLET TRUCK

George F. Quayle, Philadelphia, Pa., assignor to The Yale & Towne Manufacturing Company, Stamford, Conn., a corporation of Connecticut Application April 24, 1948, Serial No. 23,033

19 Claims. (Cl. 254—2)

This invention relates to an industrial lift truck of that type particularly adapted for use with pallets. Trucks of this class are equipped with a low lying elevating platform usually comprising a pair of spaced legs, and under each leg there is mounted a load wheel adapted for movement relatively to the elevating platform for lifting the platform. In operation, a pallet truck of the class described is moved into position between the upper and lower floors of a pallet with the load wheels thereof in alignment with spaces between the floor boards of the pallet. Thereafter, through operation of suitable lifting mechanism, the forward end of the elevating platform is raised, and at the same time the load wheels are lowered downwardly relatively to the platform and against the ground so as to effect the lifting of the rear of the elevating platform.

It has been found extremely difficult to maneuver trucks of this class into position between the floors of a pallet because the load wheels are of exceedingly small diameter, usually 3" or less, and the boards of the pallet therefore present a rather considerable obstruction to the movement of the wheels and the truck upwardly as the several floor boards are encountered. Similarly, the floor boards present a considerable obstacle to the movement of the truck outwardly from the pallet. The industrial truck industry has therefore long sought means for facilitating the manipulation of a truck of the particular class relatively to a pallet. As one solution of the problem, it has been proposed to use a series of rollers at each side of the load wheels of a pallet truck for coaction with the floor boards whereby to gradually lift the truck in easy stages until the load wheels are moved approximately to the level of the pallet floor boards. I, myself, have proposed rollers and also the utilization of cams for the particular purpose, and have disclosed such cams in an application just filed in the Patent Office. While these rollers and cams are of value, and do help to maneuver a pallet truck into and out of a pallet, they are nevertheless not a satisfactory solution of the problem as will be demonstrated hereinafter.

In a series of patents granted by the Patent Office to my assignee, Herbert J. Framhein has disclosed pallet trucks utilizing wheels intermediate the rear load wheels and the forward wheels of the truck. These intermediate wheels support the truck for movement when the platform is lowered, the load wheels being then maintained off the ground so that the elevating platform may be moved into and out of position between the floors of a pallet. While the Framhein trucks are quite effective, they nevertheless require considerable mechanism that must be added to a pallet truck, thereby increasing considerably the cost of manufacture thereof.

It is the object of this invention to contribute a pallet truck that will be capable of easy removal from between the floors of a pallet. As a feature of my invention whereby the objects thereof are attained, I so mount the elevating platform of a pallet truck relatively to the lifting head or main frame thereof that the normal downward lowering of the elevating platform will effect a retraction of the load wheels when the rear end of the platform is held above its normal position by a part of the pallet coacting with a part of the truck.

As a more particular feature of the invention, this retraction of the load wheels is obtained merely through the movement of the elevating platform in a compound manner relatively to the lifting head, rather than through the simple movement that is found in prior art trucks. Thus, as a particular feature of this part of my invention, the rear end of the truck on which the load wheels are carried is substantially fully lowered relatively to the lifting head of the truck before the forward end is lowered. Even more particularly, it is a feature of my invention that the elevating platform be mounted on spaced links relatively to the lifting head, with the links of different length whereby the elevating platform will move not in parallelogram relationship to the lifting head, but in a compound manner. By connecting the rear lifting wheels for actuation through the movement of certain of the links, the final lowering movement of the elevating platform when a part thereof is held in contact with a pallet will effect the upward swinging movement of the lifting wheels to a position facilitating the movement of the truck from the pallet.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art. It is important to note at this point that because of the nature of my invention, its characteristics can best be understood through a comparison of the construction of a truck embodying my invention and a truck of the prior art, and this comparison will be made hereinafter.

Referring now to the drawings.

Figure 1:
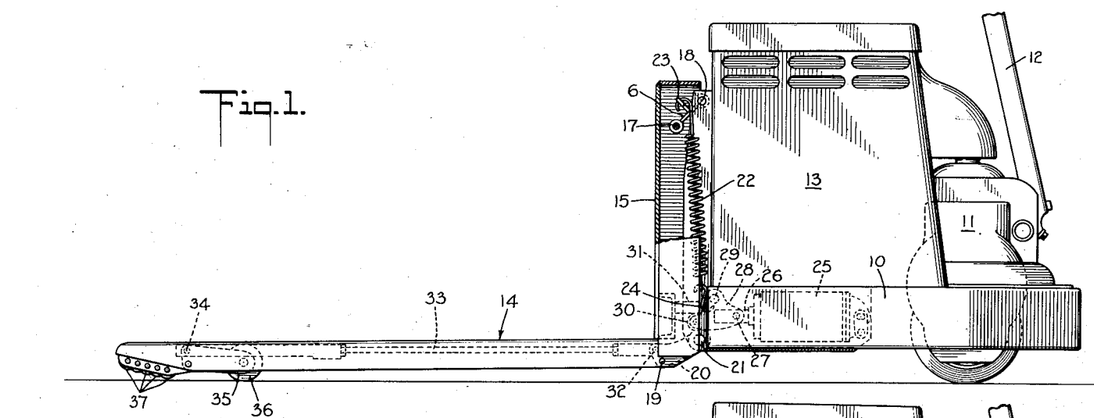
Fig. 1 is an elevation of my truck, showing the elevating platform in its lowered position with the load lifting wheels fully retracted and applied against the floor or ground.
Figure 2:
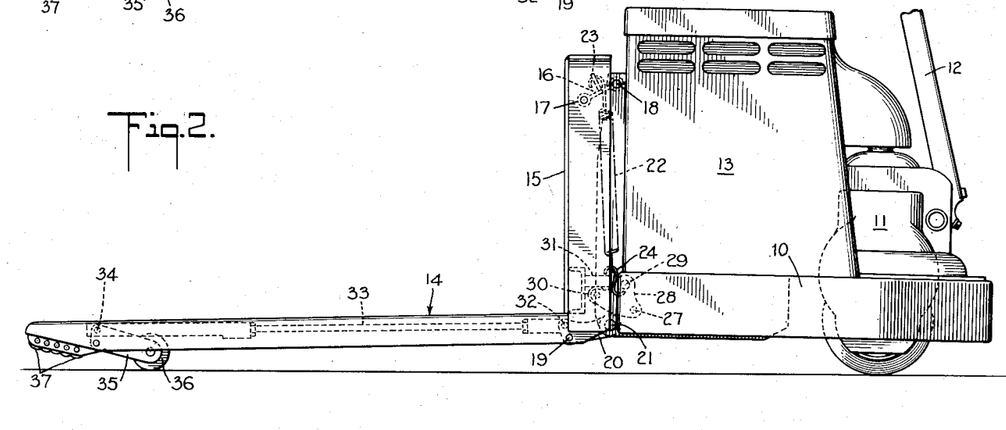
Fig. 2 illustrates the truck of Fig. 1 with the elevating platform partially lifted.

For describing my invention, I have shown it embodied in a truck substantially of that construction described and claimed by Schroeder in his application for patent, Ser. No. 650,479 filed February 27, 1946, now Patent No. 2,548,322 issued April 10, 1951. Referring first to Figs. 1 and 2, reference numeral 10 indicates generally what the art terms a lifting head. This lifting head supports at its forward end a steering and traction unit 11 that is controlled by a steering handle 12. A compartment 13 has mounted therein a battery that supplies the power for driving the traction unit 11 under the control of means carried by the steering handle 12. The elevating platform of the truck is designated generally by reference numeral 14 and is formed generally of a pair of U-legs welded or otherwise secured to a forward standard 15. This forward standard 15 is pivoted at its upper end through a link 16 relatively to the lifting head 10. Thus, as is common in this art, the link 16 is pivoted at 17 to the standard 15 and at 18 to the lifting head 10. At its lower end the standard 15 is pivoted at 19 to a link 20, the link 20 being in turn pivoted at 21 to a part of the lifting head 10. In the standard prior art trucks links 16 and 20 are of the same length and are always parallel so that the elevating platform of the truck is always in parallelogram relation to the lifting head 10. Actually, in my truck the links are otherwise related as I shall presently indicate.

A relatively heavy spring 22 is engaged at 23 with a portion of the standard 15 of the elevating platform and at 24 with a part of the lifting head 10 so as to press the elevating platform normally downwardly to its fully lowered position of Fig. 1. For elevating the platform 14 relatively to the lifting head 10, I utilize a power operated hydraulic mechanism 25, such as is well-known in this art, this mechanism being mounted on the lifting head 10 and having a piston or ram 26 pivoted at 27 to a lifting lever 28. Lifting lever 28 is in turn pivoted at 29 to the lifting head 10 and carries a roller 30 bearing against a bar 31 fixed to the elevating platform 14.

The link 20 has pivoted thereto at 32 a rod 33, there being of course one such rod for each leg of the elevating platform 14. Each rod 33 is pivoted at 34 to a lifting wheel carrier, as I shall hereinafter call it, designated by reference numeral 35. Lifting wheel carrier 35 carries a lifting wheel 36. Mounted at the rear end of each of the legs of the elevating platform 14 is a series of rollers 37 of the type adapted to encounter the floor of a pallet and to raise the elevating platform upwardly relatively to the pallet as the truck is moved into position.

Insofar as I have described my truck, it is substantially well-known in the art, and its action is as follows: Upon operation of the hydraulic mechanism 25, the roller 30 applies lift thrust to the elevating platform 14 at 31. The elevating platform is now raised relatively to the lifting head 10 on the upper and lower links 16 and 20 acting as part of a parallelogram in prior art trucks. Simultaneously, the rods 33 effect a downward swinging of the lifting wheel carriers 35 so that the rear end of the elevating platform 14 is also raised. When it is desired to lower the elevating platform, the hydraulic mechanism is suitably actuated and the elevating platform will move downwardly by gravity and also through the pressure of the springs 22 into the position of Fig. 1.

Figure 3:
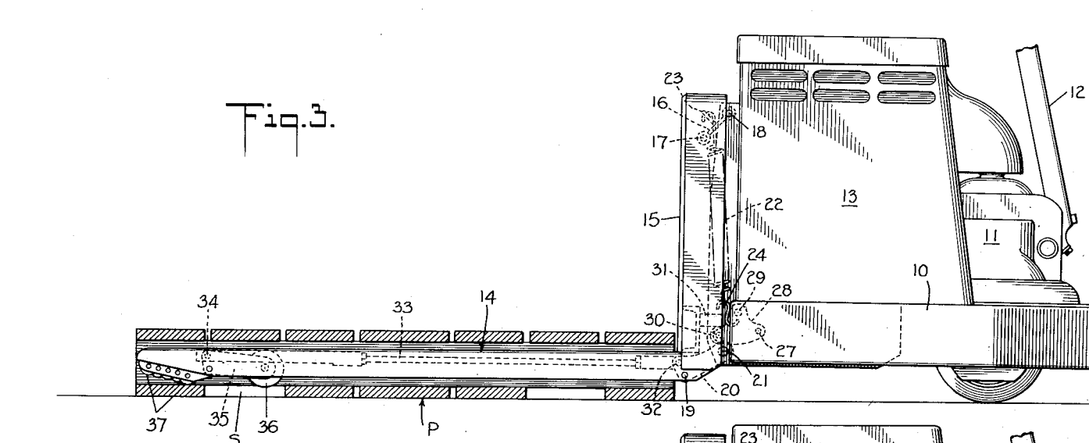
Fig. 3 shows the truck of Fig. 1 with the elevating platform inserted between the upper and lower floors of a pallet.
Figure 4:
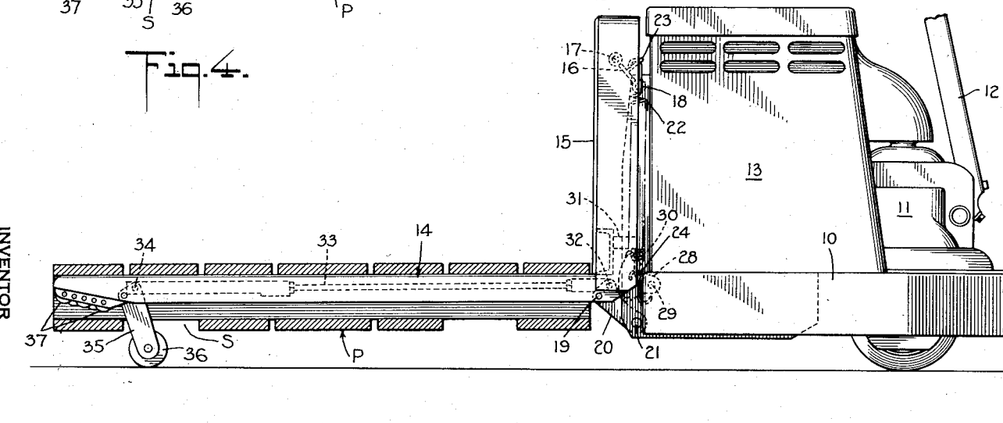
Fig. 4 shows the elevating platform of the truck of Fig. 3 fully raised.
Figure 5:
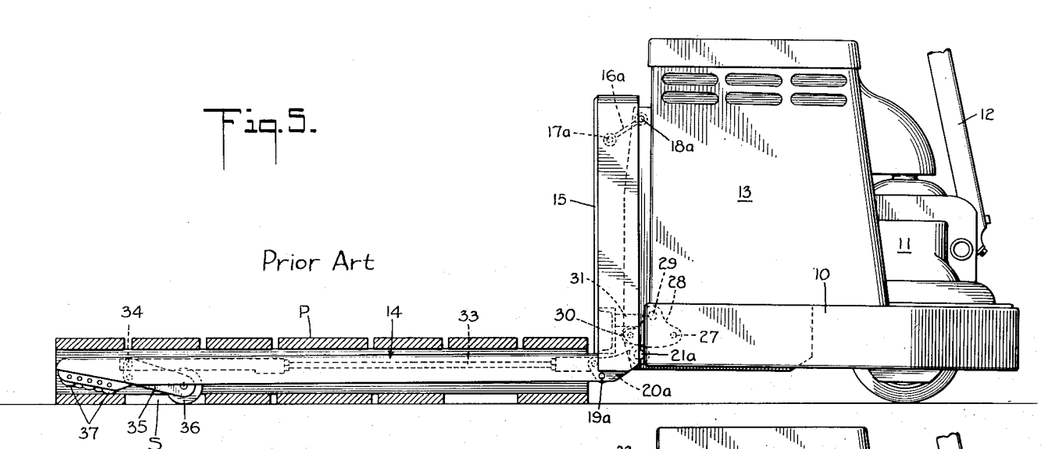
Fig. 5 shows a truck of the prior art with the platform and load wheels in the position they will occupy when the elevating platform has been lowered from its fully raised position of Fig. 4 downwardly to the fullest extent that is possible.

If a truck of the prior art, and for the purpose of this explanation the truck of Figs. 1, 3, 4, and 5 may be considered the same prior art truck, is to be utilized for raising and transporting a pallet, it is first moved from the position of Fig. 1 to the position of Fig. 3. In order to conceive the truck of the several figures as a prior art truck, it is essential to consider only that the upper and lower links 16 and 20 will be of the same length and parallel so that the elevating platform will move upwardly in parallelogram relationship to the lifting head 10 as has been standard in the industrial truck art for several decades. Fig. 5 shows the standard type of truck, and in that figure I have merely applied the letter "a" to the very same numerals that are used to designate the equivalent parts in my new truck. Now, during movement of the truck into a pallet, the several rollers 37 encounter the several boards of the pallet P for raising the truck platform and the load wheels 36 so that the load wheels will ride easily into position opposite the space S between two of the boards of the pallet.

Thereafter, upon operation of the hydraulic lifting mechanism 25, the forward end of the elevating platform will be raised on the links 16 and 20, while the rear end of the elevating platform will be raised through downward swinging movement of the lifting wheel carriers 35 into the position of Fig. 4. The elevating platform is now fully elevated and the truck may move the pallet to any desired position. Actually, both my truck and the prior art truck of Fig. 5 will operate in exactly the same manner up to this point.

Let us see what happens when the hydraulic lifting mechanism 25 is operated to allow a lowering of the elevating platform, and for this purpose, reference is made to Fig. 5. In Fig. 5 I show the elevating platform 14 of a standard prior art truck lowered until the lowermost of the rollers 37 is against the floor of the pallet P. Obviously, it is impossible to lower the rear end of the elevating platform 14 below the position of Fig. 5. If the truck is now to be moved outwardly from between the floors of the pallet P, it is necessary for the load wheels 36 to ride upwardly with carriers 35 onto the floor boards of the pallet. It has earlier been demonstrated that load wheels 36 move downwardly with lifting wheel carriers 35 when the elevating platform 14 moves upwardly relatively to the lifting head 10. Conversely, the load wheels 36 and the lifting wheel carriers 35 swing upwardly from the position of Fig. 5 relatively to platform 14 only when the elevating platform 14 moves downwardly with respect to the lifting head 10. Thus, in Fig. 5 to pull the truck forwardly and to raise the load wheels 36 through the upward swinging of the lifting wheel carriers 35, it is necessary to effect a downward movement of the elevating platform 14 relatively to the lifting head 10. However, since the elevating platform 14 cannot move downwardly in Fig. 5 because the rollers 37 are against the floor of the pallet, it follows that the lifting head 10 must move upwardly relatively to the elevating platform 14 in order to obtain that relative motion of the platform and lifting head that must accompany the upward movement of the wheels 36.

For this reason, in order to move the truck from its position of Fig. 5 outwardly of the pallet, it actually becomes necessary to raise the entire truck, or to raise the lifting head 10 relatively to the elevating platform 14. Those skilled in the art will appreciate the considerable forces that are thus involved. As a matter of fact, because the forces are rather considerable, it becomes almost impossible to remove the truck from its position of Fig. 5 unless there is a very heavy load on the pallet P. Where the pallet P is empty or unloaded, the truck will merely slide the pallet along the floor when the truck itself is moved. With this understanding of the prior art, it will now be possible to appreciate the very considerable contribution of my invention.

The truck of my invention differs from prior art trucks in that form in which I have here shown it embodied, merely through the shortening of the upper link 16 relatively to the lower link 20. Naturally, where one upper link 16 is utilized extending completely across the truck, it alone will be shortened, but it may be desirable to use two or even three parallel links. The same, as to number of links, is true of the lower link 20. It is important at this point to note that while I have shown my invention embodied in a truck of that class in which upper and lower links are utilized, it is possible also to obtain the same results in trucks in which the elevating platform moves vertically relatively to the lifting head, merely by employing cam means for effecting movement of the elevating platform longitudinally of the truck to obtain a compound movement of the elevating platform as is necessary for the operation of the invention relatively to the lifting head for accomplishing the purposes of my invention. This will be apparent presently.

Figure 8:
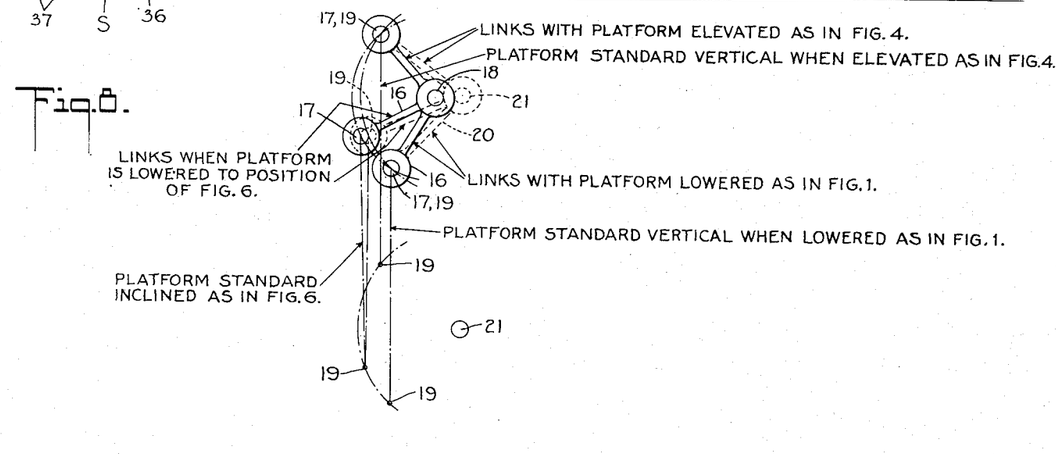
Fig. 8 is a diagrammatic view illustrating the action of the links mounting the elevating platform for movement relatively to the lifting head.

Referring now to Fig. 8, the link shown in full lines is link 16, while the link shown in dotted lines is link 20, one link being superimposed on the other to show their relation. The two links 16 and 20 are shown first in the position they occupy when the platform is lowered, as in Fig. 1. The same links are shown also in the position they occupy when the platform is in the lowered position of Fig. 6. At the upper part of Fig. 8, the two links 16 and 20 are shown when the platform is elevated as in Fig. 4.

It is first well to note from Fig. 8 that when the elevating platform is in its fully lowered position, the pivot points 17 and 19 will lie in the same vertical line, and therefore the platform standard 15 will be vertical when the elevating platform is lowered as in Fig. 1. Similarly, the two points 17, 19 are in the same vertical line when the elevating platform is fully raised, as in Fig. 4. In other words, in the fully raised position of the elevating platform and in its fully lowered position, the standard 15 will be vertical and the elevating platform 14 itself will be horizontal. This is an important phase of my invention and adds greatly to its value.

Figure 6:
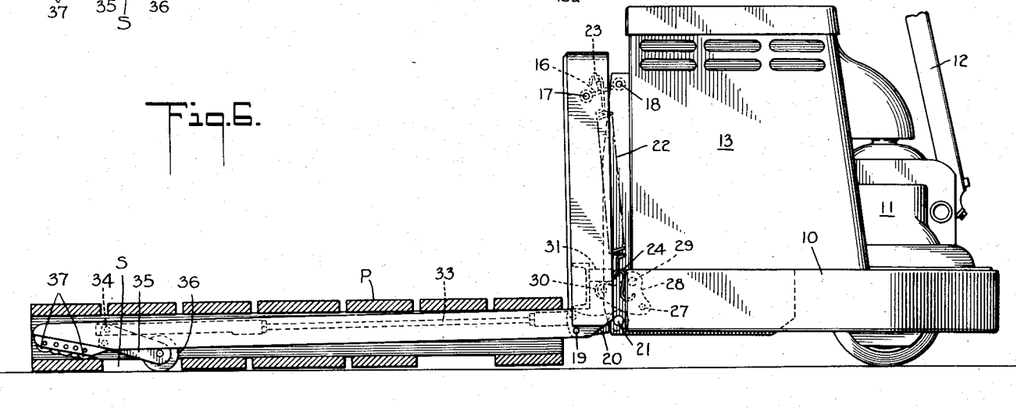
Fig. 6 shows the truck of my invention in a position to which it moves when it is lowered from its fully raised position of Fig. 4.

Referring further to Fig. 8, it will be noted that when the elevating platform is lowered from its upper position of Fig. 4 to its position of Fig. 6, there will be a separation between the vertical alignments of pivots 17 and 19. Therefore, the platform standard 15 will actually move into the inclined position noted in Fig. 8 and shown in Fig. 6. Of course, this rather peculiar alignment of the standard 15 of the elevating platform 14 relatively to the lifting head 10 marks a complete departure from prior art trucks, and is the basis of my invention, since in this position of the elevating platform, its rear end has moved to substantially fully lowered relation relatively to the lifting head 10, while the forward portion thereof represented by the standard 15 has yet to complete its downward movement relatively to the lifting head 10. With this explanation of the invention, it will now be well to refer to Figs. 3, 4, 6, and 7 for a full outline of the operation of the invention.

In Fig. 3 there is shown the position of the elevating platform when the truck has been moved into the pallet. It will be noted here that the lowermost roller 37 now supports the elevating platform in a position off the floor and with the wheels 36 spaced from the floor and over the space S of the pallet. Wheels 36 will not move downwardly relatively to the elevating platform until the elevating platform is swung upwardly on links 16, 20. If now the hydraulic lifting mechanism 25 is actuated, the forward end of the elevating platform will be raised relatively to the lifting head 10 on links 16, 20 and the wheels 36 will swing downwardly with carriers 35 to the position of Fig. 4. The elevating platform is now fully raised and the truck is ready to move the pallet P to any desired location.

It will be noted that the elevating platform is fully horizontal, and at this point it will be well to note that in Fig. 3 the entire truck is pivoted upwardly slightly because of the action of the rollers 37. If in Fig. 4 the hydraulic mechanism 25 is conditioned to allow a lowering of the elevating platform, the elevating platform will now move to the position of Fig. 6. In the position of the parts in Fig. 6, it will be noted that the lowermost roller 37 is in contact with one of the boards of the pallet P while the lifting wheels 36 are still against the ground or floor. It will further be noted that the elevating platform is now angularly positioned relatively to the lifting head 10 because of the novel relationship of the links 16 and 20 as described earlier with reference to Fig. 8. In the particular position of the parts, the rear end of the elevating platform as represented by the lowermost roller 37 has now reached a position that is substantially its lowermost position with relation to the lifting head 10.

It will now be remembered that when the platform of the prior art truck of Fig. 5 has reached substantially the same position as that of the elevating platform of my truck in Fig. 6, the elevating platform is in parallelogram relationship with the lifting head 10. It will further be remembered that in order to move the wheels 36 upwardly in Fig. 5, it is necessary to lift the truck or to lift the lifting head relatively to the elevating platform 14 because the elevating platform is held against movement downwardly. In my new construction, while the rear end of the elevating platform cannot move downwardly because of the rollers 37, the forward end of the elevating platform may move downwardly because of the angular position of the elevating platform and the action of the links 16, 20. Thus, the lowering movement of the elevating platform will not stop in the position of the parts in Fig. 6, but will continue until the parts reach the position of Fig. 7.

Figure 7:
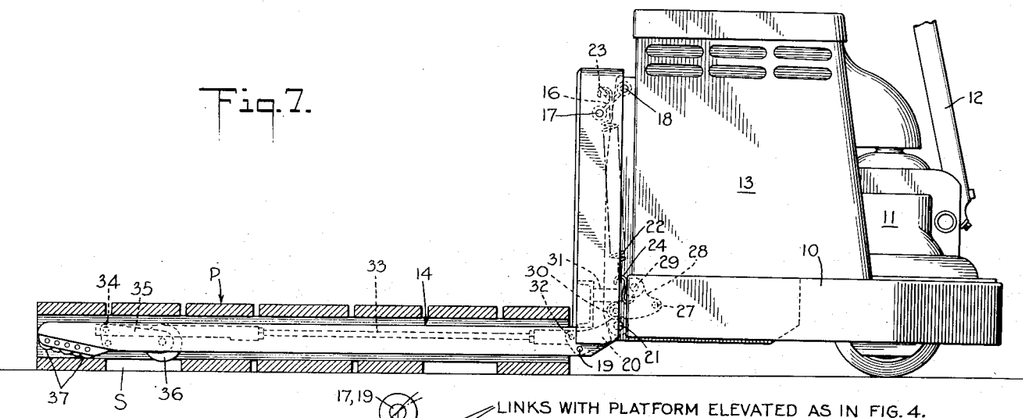
Fig. 7 illustrates the position of the elevating platform of my truck and the load wheels when the elevating platform has been fully lowered relatively to the elevating platform.

In the position of Fig. 7, the elevating platform has now pivoted downwardly relatively to the lifting head 10 to bring its standard 15 to substantially a fully lowered position. Because it has been possible to so swing the elevating platform relatively to the lifting head, it has been possible through the lower link 20 to swing carriers 35 to bring the lifting wheels 36 upwardly to the position of Fig. 7, this being the substantially same position of the parts as in Fig. 3. In other words, when my elevating platform is lowered, the lifting wheels return to substantially the same position in which they are placed by the insertion of the truck between the floor boards of the pallet. Therefore, it is quite simple to remove the truck from between the pallet floors as is obvious from an examination of Figs. 3 and 7. The easy manner in which the truck may be thus removed from between the pallet floors is further emphasized by a comparison of Fig. 7 with the prior art truck of Fig. 5 wherein the wheels 36 are shown against the floor when the elevating platform is lowered as fully as it can be lowered through the parallelogram linkage 16a, 20a.

I believe that the considerable merits of my invention will now be apparent to those skilled in the art.

I now claim:

1. In a truck of the class described, a lifting head, an elevating platform, spaced links pivoting said elevating platform relatively to said lifting head for upward lifting movement on said links relatively to said lifting head, lifting means for lifting said elevating platform relatively to said lifting head, said links being formed so that one part of said elevating platform moves in different relation to said lifting head than another part of said elevating platform, a lifting wheel for said platform, and means whereby said elevating platform moves relatively to said lifting wheel as said elevating platform moves relatively to said lifting head on said links, substantially for the purpose described.

2. In a truck of the class described, a lifting head, an elevating platform, spaced links pivoting said elevating platform relatively to said lifting head for upward lifting movement on said links relatively to said lifting head, lifting means for lifting said elevating platform relatively to said lifting head, one of said links being longer than the other so that one part of said elevating platform moves in different relation to said lifting head than another part of said elevating platform, a lifting wheel for said platform, and means whereby said elevating platform moves relatively to said lifting wheel as said elevating platform moves relatively to said lifting head on said links, substantially for the purpose described.

3. In a truck of the class described, a lifting head, an elevating platform, spaced links pivoting the forward end of said elevating platform relatively to said lifting head for upward lifting movement on said links relatively to said lifting head, lifting means for lifting said elevating platform relatively to said lifting head, said links being formed so that one part of said elevating platform moves in different relation to said lifting head than another part of said elevating platform, a lifting wheel for said platform, and means whereby the rearward end of said elevating platform moves relatively to said lifting wheel as the forward end of said elevating platform moves relatively to said lifting head on said links, substantially for the purpose described.

4. In a truck of the class described, a lifting head, an elevating platform, spaced links pivoting the forward end of said elevating platform relatively to said lifting head for upward lifting movement on said links relatively to said lifting head, lifting means for lifting said elevating platform relatively to said lifting head, one of said links being longer than the other so that one part of said elevating platform moves in different relation to said lifting head than another part of said elevating platform, a lifting wheel for said platform, and means whereby the rearward end of said elevating platform moves relatively to said lifting wheel as the forward end of said elevating platform moves relatively to said lifting head on said links, substantially for the purpose described.

5. In a truck of the class described, a lifting head, an elevating platform, upper and lower links pivoting the forward end of said elevating platform relatively to said lifting head for upward lifting movement on said links relatively to said lifting head, lifting means for lifting said elevating platform relatively to said lifting head, said links being formed so that the rear part of said elevating platform moves in different relation to said lifting head than the forward part of said elevating platform, a lifting wheel for said platform, and means whereby the rear part of said elevating platform moves relatively to said lifting wheel as the forward end of said elevating platform moves relatively to said lifting head on said links, substantially for the purpose described.

6. In a truck of the class described, a lifting head, an elevating platform, spaced links pivoting said elevating platform relatively to said lifting head for upward lifting movement on said links relatively to said lifting head, lifting means for lifting said elevating platform relatively to said lifting head, said links being formed so that one part of said elevating platform moves in different relation to said lifting head than another part of said elevating platform, a lifting wheel, mounting means for mounting said lifting wheel under the rear end of said elevating platform for movement relatively to said elevating platform, and means connecting the said mounting means with one of said links for movement with said link to lower and raise said lifting wheel as said link is moved incidental to the lifting and lowering of said elevating platform relatively to said lifting head.

7. In a truck of the class described, a lifting head, an elevating platform, spaced links pivoting said elevating platform relatively to said lifting head for upward lifting movement on said links relatively to said lifting head, lifting means for lifting said elevating platform relatively to said lifting head, said links being formed so that one part of said elevating platform moves in different relation to said lifting head than another part of said elevating platform, a lifting wheel, a lifting wheel carrier mounting said lifting wheel under the rear end of said elevating platform for movement relatively to said elevating platform, and means connecting said lifting wheel carrier with one of said links for movement with said link to lower and raise said lifting wheel as said link is moved incidental to the lifting and lowering of said elevating platform relatively to said lifting head.

8. In a truck of the class described, a lifting head, an elevating platform, spaced links pivoting said elevating platform relatively to said lifting head for upward lifting movement on said links relatively to said lifting head, lifting means for lifting the forward end of said elevating platform relatively to said lifting head, one of said links being longer than the other so that one part of said elevating platform moves in different relation to said lifting head than another part of said elevating platform, a lifting wheel, a lifting wheel carrier mounting said lifting wheel under the rear end of said elevating platform for movement relatively to said elevating platform, and means connecting said lifting wheel carrier with the longer one of said links for movement with said link to lower and raise said lifting wheel as said link is moved incidental to the lifting and lowering of said elevating platform relatively to said lifting head.

9. In a truck of the class described, a lifting head, an elevating platform, spaced links pivoting the forward end of said elevating platform relatively to said lifting head for upward lifting movement on said links relatively to said lifting head, lifting means for lifting the forward end of said elevating platform relatively to said lifting head, one of said links being longer than the other so that one part of said elevating platform moves in different relation to said lifting head than another part of said elevating platform, a lifting wheel, a lifting wheel carrier mounting said lifting wheel under the rear end of said elevating platform for movement relatively to said elevating platform, and means connecting said lifting wheel carrier with the longer of said links for movement with said link to lower and raise said lifting wheel as said lnk is moved incidental to the lifting and lowering of said elevating platform relatively to said lifting head.

10. In a truck of the class described, a lifting head, an elevating platform, upper and lower links pivoting the forward end of said elevating platform relatively to said lifting head for upward lifting movement on said links relatively to said lifting head, lifting means for lifting the forward end of said elevating platform relatively to said lifting head, said links being formed so that one part of said elevating platform moves in different relation to said lifting head than another part of said elevating platform, a lifting wheel, a lifting wheel carrier mounting said lifting wheel under the rear end of said elevating platform for movement relatively to said elevating platform, and means connecting said lifting wheel carrier with the lower of said links for movement with said link to lower and raise said lifting wheel as said link is moved incidental to the lifting and lowering of said elevating platform relatively to said lifting head.

11. In a truck of the class described, a lifting head, an elevating platform, upper and lower links pivoting the forward end of said elevating platform relatively to said lifting head for upward lifting movement on said links relatively to said lifting head, lifting means for lifting the forward end of said elevating platform relatively to said lifting head, the upper of said links being shorter than the lower link so that one part of said elevating platform moves in different relation to said lifting head than another part of said elevating platform, a lifting wheel, a lifting wheel carrier mounting said lifting wheel under the rear end of said elevating platform for movement relatively to said elevating platform, and means connecting said lifting wheel carrier with the lower of said links for movement with said link to lower and raise said lifting wheel as said link is moved incidental to the lifting and lowering of said elevating platform relatively to said lifting head.

12. In a truck of the class described, a lifting head, an elevating platform having a vertical forward standard, upper and lower links pivoting said standard to said lifting head for upward lifting movement on said links relatively to said lifting head, lifting means for lifting the forward end of said elevating platform relatively to said lifting head, the upper of said links being shorter than the lower link whereby said standard will assume an angular position when near its lowered position with the rear end of said elevating platform substantially lowered whereby the final lowering of said elevating platform on said links relatively to said lifting head comprises merely the lowering of the forward portion thereof and said standard relatively to said lifting head, a lifting wheel, a lifting wheel carrier pivotally mounting said lifting wheel under the rear end of said elevating platform for movement relatively to said elevating platform, and means connecting said lifting wheel carrier with the lower and longer of said links for movement with said link to lower and raise said lifting wheel as said link is moved incidental to the lifting and lowering of said elevating platform relatively to said lifting head.

13. In a truck of the class described, a lifting head, an elevating platform, spaced links pivoting said elevating platform relatively to said lifting head for upward lifting movement on said links relatively to said lifting head, lifting means for lifting said elevating platform relatively to said lifting head, said links being formed so that one part of said elevating platform moves in different relation to said lifting head than another part of said elevating platform, a lifting wheel, mounting means for mounting said lifting wheel under the rear end of said elevating platform for movement relatively to said elevating platform, means connecting the said mounting means with one of said links for movement with said link to lower and raise said lifting wheel as said link is moved incidental to the lifting and lowering of said elevating platform relatively to said lifting head, and support means under the rear end of said elevating platform cooperable with the floor boards of a pallet for supporting said elevating platform on said pallet when said lifting wheel is raised off the ground while between the floor boards of the pallet.

14. In a truck of the class described, a lifting head, an elevating platform, spaced links pivoting said elevating platform relatively to said lifting head for upward lifting movement on said links relatively to said lifting head, lifting means for lifting said elevating platform relatively to said lifting head, said links being formed so that the rear of said elevating platform moves in different relation to said lifting head than the forward part thereof, a lifting wheel, a lifting wheel carrier mounting said lifting wheel under the rear end of said elevating platform for movement relatively to said elevating platform, means connecting said lifting wheel carrier with one of said links for movement with said link to lower and raise said lifting wheel as said link is moved incidental to the lifting and lowering of said elevating platform relatively to said lifting head, and a roller or the like under the rear end of said elevating platform cooperable with the floor boards of a pallet for supporting said elevating platform on said pallet when said lifting wheel is raised off the ground while between the floor boards of the pallet.

15. In a truck of the class described, a lifting head, an elevating platform, spaced links pivoting the forward end of said elevating platform relatively to said lifting head for upward lifting movement on said links relatively to said lifting head, lifting means for lifting the forward end of said elevating platform relatively to said lifting head on said links, one of said links being longer than the other so that the rear of said elevating platform moves in different relation to said lifting head than the forward end thereof, a lifting wheel, a lifting wheel carrier mounting said lifting wheel under the rear end of said elevating platform for movement relatively to said elevating platform, means connecting said lifting wheel carrier with the longer one of said links for movement with said link to lower and raise said lifting wheel as said link is moved incidental to the lifting and lowering of said elevating platform relatively to said lifting head, and a roller or the like under the rear end of said elevating platform cooperable with the floor boards of a pallet for supporting said elevating platform on said pallet when said lifting wheel is raised off the ground while between the floor boards of the pallet.

16. In a truck of the class described, a lifting head, an elevating platform having a vertical forward standard, upper and lower links pivoting said standard to said lifting head for upward lifting movement on said links relatively to said lifting head, the upper of said links being shorter than the lower link whereby said standard will assume an angular position when near its lowered position with the rear end of said elevating platform substantially fully lowered, whereby the final lowering of said elevating platform on said links relatively to said lifting head comprises merely the lowering of the forward portion thereof and said standard relatively to said lifting head, lifting means for lifting the forward end of said elevating platform relatively to said lifting head, a lifting wheel, a lifting wheel carrier pivotally mounting said lifting wheel under the rear end of said elevating platform for movement relatively to said elevating platform, means connecting said lifting wheel carrier with the lower and longer of said links for movement with said link to lower and raise said lifting wheel as said link is moved incidental to the lifting and lowering of said elevating platform relatively to said lifting head, and a roller or the like under the rear end of said elevating platform cooperable with the floor boards of a pallet for supporting said elevating platform on said pallet when said lifting wheel is raised off the ground while between the floor boards of the pallet.

17. In a truck of class described, a lifting head, an elevating platform having a vertical forward standard, means mounting said standard on said lifting head for upward lifting movement relatively to said lifting head, lifting wheels supporting the rear end of said elevating platform, means whereby said lifting wheels are mounted for movement relatively to the rear end of said elevating platform to lift and lower said rear end, the said mounting means guiding said standard to an angular position relatively to the vertical when near its lowered position with the rear end of said elevating platform substantially fully lowered on said lifting wheels, whereby the final lowering of said elevating platform on said mounting means relatively to said lifting head comprises merely the lowering of the forward portion thereof and said standard relatively to said lifting head, and lifting means for moving said lifting wheels relatively to said rear end of the elevating platform and for lifting said elevating platform relatively to said lifting head on said mounting means.

18. In a truck of the class described, a lifting head, an elevating platform having a vertical forward standard, means mounting said standard on said lifting head for upward lifting movement relatively to said lifting head, the said mounting means guiding said standard to an angular position relatively to the vertical when near its lowered position with the rear end of said elevating platform substantially fully lowered, whereby the final lowering of said elevating platform on said mounting means relatively to said lifting head comprises merely the lowering of the forward portion thereof and said standard relatively to said lifting head, lifting means for lifting the forward end of said elevating platform relatively to said lifting head, a lifting wheel, a lifting wheel carrier mounting said lifting wheel under the rear end of said elevating platform for movement relatively to said elevating platform, and means actuating said lifting wheel carrier for movement to lower and raise said lifting wheel incidental to the lifting and lowering of said elevating platform on said mounting means relatively to said lifting head.

19. In a truck of the class described, a lifting head, an elevating platform having a vertical forward standard, means mounting said standard on said lifting head for upward lifting movement relatively to said lifting head, the said mounting means guiding said standard to an angular position relatively to the vertical when near its lowered position with the rear end of said elevating platform substantially fully lowered, whereby the final lowering of said elevating platform on said mounting means relatively to said lifting head comprises merely the lowering of the forward portion thereof and said standard relatively to said lifting head, lifting means for lifting said elevating platform relatively to said lifting head, a lifting wheel, a lifting wheel carrier mounting said lifting wheel under the rear end of said elevating platform for movement relatively to said elevating platform, means actuating said lifting wheel carrier for movement to lower and raise said lifting wheel incidental to the lifting and lowering of said elevating platform on said mounting means relatively to said lifting head, and a roller or the like under the rear end of said elevating platform cooperable with the floor boards of a pallet for supporting said elevating platform on said pallet when said lifting wheel is raised off the ground while between the floor boards of the pallet.

GEORGE F. QUAYLE.

REFERENCES CITED

The following references are of record in the file of this patent:

UNITED STATES PATENTS

| Number | Name | Date |
| --- | --- | --- |
| 952,108 | Gilleland | Mar. 15, 1916 |
| 1,744,894 | Hibbard | Jan. 28, 1930 |
| 2,110,424 | Quayle | Mar. 8, 1938 |
| 2,274,164 | Quayle | Feb. 24, 1942 |
| 2,385,512 | Heath | Sept. 25, 1945 |